United States Patent
Maloney et al.

(10) Patent No.: US 6,269,447 B1
(45) Date of Patent: Jul. 31, 2001

(54) INFORMATION SECURITY ANALYSIS SYSTEM

(75) Inventors: Michael P. Maloney, Severna Park; John M. Suit, Pasadena; Rich Rubel, Glen Burnie; Francis M. Woodus, Owings Mills, all of MD (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/358,131

(22) Filed: Jul. 19, 1999

Related U.S. Application Data

(60) Provisional application No. 60/093,559, filed on Jul. 21, 1998.

(51) Int. Cl.[7] .................................................. G06F 11/00
(52) U.S. Cl. ............................................. 713/201; 717/4
(58) Field of Search ........................... 713/201; 709/223, 709/224; 717/4

(56) References Cited

U.S. PATENT DOCUMENTS

| | | | |
|---|---|---|---|
| 5,410,648 | 4/1995 | Pazel | 395/158 |
| 5,414,833 | 5/1995 | Hershey et al. | 395/575 |
| 5,440,723 | 8/1995 | Arnold et al. | 395/181 |
| 5,537,540 | 7/1996 | Miller et al. | 395/183.14 |
| 5,555,419 * | 9/1996 | Arsenault | 717/4 |
| 5,608,854 | 3/1997 | Labedz et al. | 395/141 |
| 5,684,945 * | 11/1997 | Chen | 714/220 |
| 5,794,046 * | 7/1998 | Meier | 717/4 |
| 5,796,951 * | 8/1998 | Hamner | 709/223 |
| 5,819,094 * | 10/1998 | Sato | 717/4 |
| 5,822,535 * | 10/1998 | Takase | 709/226 |
| 5,832,208 | 11/1998 | Chen et al. | 395/187.01 |
| 5,845,081 * | 12/1998 | Rangarajan | 709/224 |

(List continued on next page.)

FOREIGN PATENT DOCUMENTS

| | | | |
|---|---|---|---|
| 409171460A * | 6/1997 | (JP) . | |
| 09 171 460 | 6/1997 | (JP) | G06F/9/06 |
| WO 98/42103 | 9/1998 | (WO) . | |

OTHER PUBLICATIONS

Yau S S et al, "An Interactive Software Maintenance Environment," AFIPS Conference Proceedings, pp. 553, 555–561, Jun. 1987.

Saito T et al, "Protection Against Trojan Horses by Source Code Analysis," Electronics & Communications in Japan, Part III—Fundamental Electronic Science, pp. 11–18, Jan. 1994.

Lo R et al, "Towards a Testbed for Malicious Code Detection," Computer Society Annual Conference, p. 160–166, 1991.

(List continued on next page.)

*Primary Examiner*—Robert Beausoleil
*Assistant Examiner*—Bryce P. Bonzo
(74) *Attorney, Agent, or Firm*—Baker Botts L.L.P.

(57) ABSTRACT

The analysis system is a collection, configuration and integration of software programs that reside on multiple interconnected computer platforms. The software, less computer operating systems, is a combination of sensor, analysis, data conversion, and visualization programs. The hardware platforms consist of several different types of interconnected computers, which share the software programs, data files, and visualization programs via a Local Area Network (LAN). This collection and integration of software and the migration to a single computer platform results in an approach to LAN/WAN monitoring in either a passive and/or active mode. The architecture permits digital data input from external sensors for analysis, display and correlation with data and displays derived from four major software concept groups. These are: Virus Computer Code Detection; Analysis of Computer Source and Executable Code; Dynamic Monitoring of Data Communication Networks; 3-D Visualization and Animation of Data.

21 Claims, 7 Drawing Sheets

U.S. PATENT DOCUMENTS

| | | | | |
|---|---|---|---|---|
| 5,923,849 | * | 7/1999 | Venkatraman | 709/224 |
| 5,958,010 | | 9/1999 | Agarwal et al. | 709/224 |
| 5,960,170 | | 9/1999 | Chen et al. | 395/183.14 |
| 5,960,439 | * | 9/1999 | Hamner | 707/103 |
| 5,991,881 | * | 11/1999 | Conkliin | 713/201 |
| 6,026,442 | * | 2/2000 | Lewis | 709/229 |
| 6,043,825 | * | 2/2000 | Glenn | 345/440 |
| 6,067,106 | * | 6/2000 | Hamner | 709/223 |

OTHER PUBLICATIONS

Deri L., Mankis D., "VRML: Adding 3D to Network Management", 4th International Conference on Intelligence in Services and Networks, pp. 469–477, May 27–29, 1997.

Law A M et al, "Simulation Software for Communications Networks: The State of the Art," IEEE Communications Magazine, vol. 32, No. 3, pp. 44–50, Mar. 1, 1994.

Chang C K; Al–Saloan Y Y; Defanti T, Scientific Visualization: A Performance Study of CSMA/CD with Connected Data Links—(Hybrid–Ethernet), Proceedings of the Third Workshop on Future Trends of Distributed Computing Systems, pp. 389–394, Apr. 14–16, 1992.

PCT International Search Report dated Dec. 2, 2000 for PCT/US99/12394 dated Jul. 20, 1999, Dec. 2, 1999.

PCT International Search Report dated Nov. 17, 1999 for PCT/US99/12393 dated Jul. 20, 1999.

PCT International Search Report dated Dec. 1, 1999 for PCT/US/99/16467 dated Jul. 20, 1999.

* cited by examiner

INFORMATION SECURITY ANALYSIS SYSTEM

RELATED APPLICATION

This application claims the benefit of U.S. provisional application Ser. No. 60/093,559, filed Jul. 21, 1998, entitled Information Security Analysis System.

TECHNICAL FIELD OF THE INVENTION

This invention relates to an information security analysis system for mitigation of Internet security issues and computer source and executable code visualization problems. In particular, the invention relates to an information security analysis system for passive display of the physical and virtual characteristics of intranets and small computer source and executable code.

BACKGROUND OF THE INVENTION

Worldwide Internet usage continues to grow at a phenomenal rate. Users include governments, institutions, businesses, and individuals, all of which have connected to the Internet for the purpose of conducting daily activities. Unfortunately, the development and implementation of security measures designed to make Internet connection a secure means of communication have not kept pace with the technological advances in the expansion of network development and interconnectivity. As a result Internet users and networks risk having their information compromised by hackers and malicious users who continue to find ways to exploit and subvert networks and data.

Used appropriately, firewall technologies can help to secure the "front door" of corporate intranets, but these technologies have trouble keeping pace with the applications, services and security that users demand. Although many products have been developed that facilitate network topology discovery, few of these are able to act passively.

Intranet security and monitoring needs are continuing to increase in both government and private industry. This is substantiated almost daily in trade publications and Internet news groups. More concrete proof of this resides in the increased requirements for security related skills outlined in government requests for proposals. Both government and private industry are spending significant amounts of time and money to address intranet mapping, monitoring, intrusion detection and computer security. This has lead to a prolific amount of organizations, offering to provide intranet computer security services, analysis tools, and associated products.

SUMMARY OF THE INVENTION

The system of the present invention acts passively and provides a methodology for performing a detailed analysis of data observed during a monitoring session.

Without introducing additional traffic on a network, the system of the present invention produces a virtual picture of network usage and network vulnerabilities. By organizing the inputs of multiple collection tools into visual schematics, Security Administrators become proactive in assessing network weaknesses and in identifying optimum locations for implementing security measures. With the information revealed by the system of the present invention, Security Administrators can identify potential traffic bottlenecks, locate the existence of backdoors, reduce bandwidth usage, develop profiles of users, and pinpoint illicit activity.

The software system of the present invention includes four interconnected modules: passive network discovery, network data recording, network data parsing, and network data analysis tools. Network data visualization capabilities are contained within the passive network discovery and network data analysis modules. The software system enables computer code analysis and the 3-D visualization and animation of network traffic and structure. Optional plug-ins further expand and enhance the software capabilities, thus allowing the software system to remain current regardless of network evolution.

The system of the present invention enables a system administrator to map the network, determine normal and abnormal usage patterns, locate virus attacks, manage network allocation, and display the network.

More technically, the analysis system is a collection, configuration and integration of software programs that reside on multiple interconnected computer platforms. The software, less computer operating systems, are a combination of sensor, analysis, data conversion, and visualization programs. The hardware platforms consist of several different types of interconnected computers, sharing the software programs, data files, and visualization programs via a Local Area Network (LAN). It is this collection and integration of software and the migration to a single computer platform that results in an approach to LAN/WAN monitoring in either a passive and/or active mode. For example, router and firewall software can be monitored in near real time to determine if the code has been functionally changed regardless of security precautions. LAN/WAN data contained in the protocols from the Data Link to Presentation layers in the OSI model are available for analysis with associated displays in two and three-dimensional space.

The architecture also enables digital data input from external sensors for analysis, display and correlation with data and displays derived from four major software groups. These are: Virus Computer Code Detection; Analysis of Computer Source and Executable Code; Dynamic Monitoring of Data Communication Networks; 3-D Visualization and Animation of Data.

The present analysis system templates and displays virus computer code in a graphical functional mode. Current techniques rely on bit stream or real-time monitoring to detect a computer virus in the host computer. The approach of the analysis system of the present invention examines the functionality of suspect code to determine if a computer virus is present prior to its execution in the host computer. The approach can be viewed as deriving a genetic structure and then determining if the genetic structure is resident, for example, in a computer program, file, or e-mail attachments.

Further, the analysis system of the present invention graphically displays and performs comparisons between like types of computer source and executable code in multidimensional space to determine if the code has undergone single or multiple functional alterations. The analysis system enables graphical analysis, code sequencing, and comparison of two or more similar source and/or executable computer programs to determine the degree of functional alteration. This can document, graph, animate, dynamically explore and determine functionality in a single computer source or executable program. The system of the present invention is also capable of sorting source and executable code by language and displaying the results in a graphical functional format. For example, a router's filter table file can be monitored periodically to determine if the file has been functionally changed regardless of current standard security precautions.

The analysis system of the present invention passively discovers the physical and virtual characteristics of digital data communication networks and simultaneously displays different digital communication networks in an interactive manner. Virtual discovery is defined as the ability to determine how the digital data network is being used by its participants and who is connecting to whom at any point in time. This process also determines the configuration changes in a digital data communication network over selectable time intervals. The physical presence of the analysis system of the present invention, in the passive mode, on a LAN/WAN system is undetectable when using conventional techniques, requires no user privileges, consumes no network bandwidth, and does not interfere with communications on LAN/WAN systems. The analysis system can quickly map SubNets and build complete networks as terminal activity increases. Each active terminal target in the network is mapped and displayed along with appended information. The displayed information shows both physical and virtual relationships, as well as network representations. The analysis system can also be combined with network probes to form remote monitoring, collaboration and discovery of LAN systems. In this scenario, a terminal acts as a master unit with input from the remote probes. In this mode of operation a passive mode of operation may or may not cease depending on whether collaboration is in-band and/or out-of-band.

The analysis system of the present invention dynamically displays, rotates, and animates any data it receives from the three major software groups in three or more dimensions. Simultaneous viewing of different types of digital data in either a physical and/or virtual realms is available.

In accordance with the present invention, the connectivity and functionality for each type of digital data is displayed. The data from each of the three major software groups can be displayed and rotated on any axis on two or more separate but connected visual plains. The process also displays connectivity between different types of data from the three major software groups to include data input from external sensors. The visualization software can append user definable symbols for easier understanding by an operator or analyst. The software interacts with a node via a "mouse click" and dynamically retrieves, decodes and displays information relating to the node that is represented by the three major software groups. In the event that the 3-D nodal diagrams become cluttered, the analyst contracts several nodes into single interconnecting common nodes. This capability provides an uncluttered representation of the original diagram for the analyst while maintaining functionality of the individual contracted nodes.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE INVENTION

Figure 1:
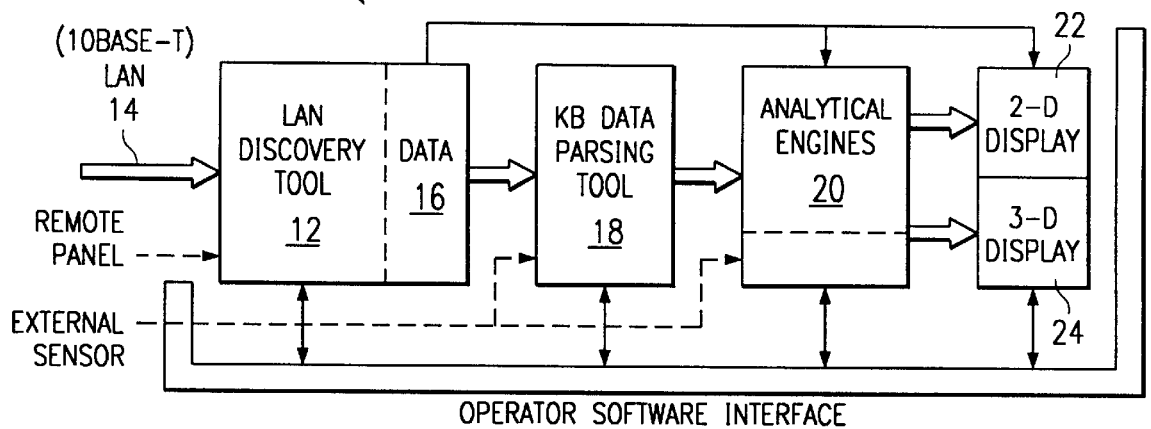
FIG. 1 is a block diagram of an information security analysis system for passive network data discovery, visualization and analysis in accordance with the present invention.

Referring to FIG. 1, there is illustrated an information security analysis system 10 including a discovery tool 12 for actively or passively monitoring a local access network (LAN) by means of a data channel 14. Functionally, the discovery tool 12 comprises: sensor management, passive network discovery (network viewer, network topology); packet analyzer, knowledge base viewing, and alerting and reporting. In addition, the discovery tool 12 collects traffic and usage data and maps the network connectivity. Data collected by the discovery tool 12 becomes part of a knowledge base 16 stored in memory. Data is organized by major categories as follows: Address, Host, LM-Host, Domain, LM-Domain, SubNet, IP-Address, WWW, MAC-Address, NetwareHost, NetwareNetwork, NetwareStation, Alert, NetwareServer Type, Application, OS, WWW-Browser, WWW-Server, HTTP-Server, NNTP-Server, Protocol, User, POP3-User, FTP-User, SMTP-Sender, SMTP-Receiver, POP3-Password, FTP-Password, Router, and Vendor.

Data in the knowledge base 16 is made available to a data parsing tool 18 that converts the captured network data from the discovery tool 12 to a form useable by downstream programs of the system. Data accessed by the parsing tool 18 is then available to analytical engine 20 for analyzing the data captured by the discovery tool 12 and supports the merging of several data files and the development and comparison of network usage patterns. The analytical engine 20 may be implemented by software from i2 Inc. and marketed under the trademark "Analyst's Notebook". A second analytical engine 20 from the Department of Defense called PROPELLER is also available. The present invention is also capable of utilizing additional analytical engines as such engines become available. The analytical engines 20 are a dynamic set of graphic tools for capturing and displaying a variety of relational data sets in a format referred to as a "link chart". By use of the analytical engine 20, such as "Analyst's Notebook", data collected can be exploited to characterize and document network characteristics and/or locate possible network intruders. After collecting and organizing data, the analytical engine 20 can be used to make associations between a number of different data charts to determine correlation or differentiation. Relationships between and array of data sources are then available to verify hypothesis, to correlate relationships among multiple data sets and to identify target data within a large data set. Network data needs to be analyzed in order to relate knowledge base data to session data, packet data, and alert data. These relationships assist in determining who has been talking to whom, as well as the content of the traffic for specific protocols (HTP, HTTP, NNTP, POP3, SMTP, TELNET, and IMAP). In the process of analyzing network data, a determination is made as to what IP and/or MAC addresses are common to more than one data set. Characterizing the network in this way, requires taking a periodic snapshot of captured data over a time period. The average of what IP and MAC addresses exists are used to create a link chart representing traffic between each address set. This same process characterizes either a portion of a network or the entire network.

By operation of the analytical engines 20, commonly reused resources may be determined by use of a sampling technique. A time period of interest is identified that will reveal common usage and data is captured during that period. For example, to determine the volume of E-mail traffic between 11:00 a.m. and 1:00 p.m., sampling would occur each day for several weeks until similarities in traffic source and destinations are apparent. After completion of the sampling, the analytical engines 20 can create a chart that inventories all of the IP and/or MAC addresses that have been identified in the sampling.

Several options are available for displaying the analyzed data including a 2-D display 22 and a 3-D display 24. Each of the tools 12 and 18, the analytical engine 20 and the displays 22 and 24 are functionally interconnected to an operator software interface for receiving instructions from an operator of the information security analysis system 10.

The system of FIG. 1 accepts external sensor data (i.e., biometric information, billing data, SS7, PBX, paging information) in digital formats. When the external data is combined with network discovery and analysis tools there is provided a clear picture of the total communication security process. Thus, the system of the present invention combines physical security needs with electronic communication systems and IS/IT/CIO departments into a complete surveillance package.

In accordance with operator instructions, the system records and plays back selected portions of the stored database for after the-fact analysis and visualization in two or three dimensions. This is adaptable for external sensor and/or intrusion detection data.

In addition, the system of FIG. 1, may decode FTP, HTTP and TELNET, POP3, SMTP, NNTP, and IMAP sessions in near real time and/or after the fact. The modular architecture of the present invention allows plug-in modules to be added to further enhance and expand protocol decodes to include session reconstruction. This feature permits the analysis system 10 to automatically determine the context of information traveling on an Intranet. This information is then put into nodal diagrams for Network Security personnel to determine what information needs further protection. It also can be used to answer the questions like: are illegal businesses being conducted within the Intranet; what if any harassment is taking place from an employee to another individual; where are employees spending their time on the World Wide web.

In one implementation of the information security analysis system 10, a Pentium-based PC was utilized with a minimum of 166 MHz CPU running the WindowsNT 4.0 operating system. Further, the analysis system 10 included 64 megabyte of real RAM, a 1-gigabyte hard drive and a 17-inch monitor. Improved operation of the information security analysis system 10 is achieved by utilization of a Pentium-II/300 or better with 128 megabyte of real RAM, a 4 gigabyte hard drive and a 21 inch monitor.G13

Figure 2:
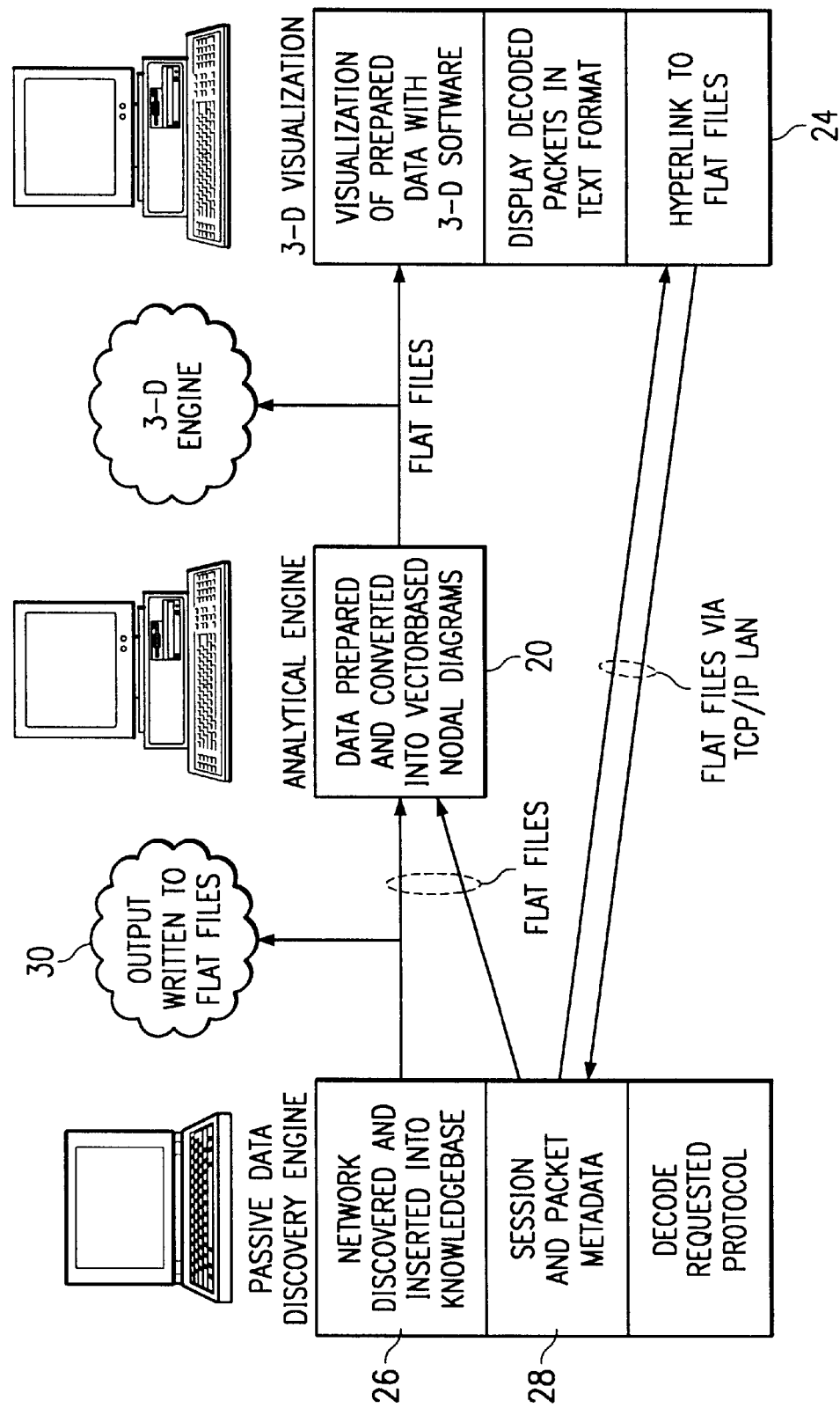
FIG. 2 is an application flow diagram of the information security analysis system of FIG. 1.

Referring to FIG. 2 there is shown a flow diagram of one application of the information security analysis system 10 of FIG. 1. A passive data discovery engine (discovery tool 12) is utilized to gather data regarding a network and once discovered the data is inserted into the knowledge base 16.

Specifically, the discovery tool 12 gathers data to grab small computer source and executable code nodal diagram in two and three dimensional space Collection of this data enable scaling and displaying large computer code nodal diagrams thereby permitting an analysis the flexibility to view and observe the interconnections within a large body of code for computer equipment that supports digital data communication networks. Gathering computer source and executable code by the discovery tool 12 also enables the system of the present invention to synthetically simulate small computer source and executable code program while viewing related nodal diagram in 3-D space. This enables the determination of where a malicious code might reside within a program, identify memory locations where the data resides after a program has finished execution, and use graphic vectors as templates to find specific types of code modules (that is, viruses, encryption algorithms). In addition the discovery tool 12, collects data on intranets (that is, LAN/WAN) for simultaneous display in two-dimensions the physical and virtual network diagrams. This enables the system analysis to instantaneously display physical equipment net connection of a data communications network. By way of example, by implementing a sum and difference routine, a system analyst is able to determine when new terminals and/or configurations are added or removed from the network to include possible identification of intranet "back-doors". Collection of this data on internets enables virtual intranet diagrams thereby permitting real time analysis of how the network is being used, who is communicating with whom, determination of potential choke points and vulnerabilities, limited "trace route" reconstruction and types of worldwide web service requested.

In addition, the discovery engine gathers structure information on the network, the method of operation of the network and network users. A typical discovery engine coordinates information from multiple sensors to provide an in-depth picture of network data. In addition, the discovery engine collects data on an operating session of a network in addition to packets of meta data all created along with the knowledge base as "flat files". In addition to gathering and analyzing Ethernet LAN traffic the discovery engine may also be configured to gather and analyze data on other types of network traffic including ATM, WAN protocols, and cellular communications.

The discovery engine (discovery tool 12) generates a knowledge base of data learned about a network and this data is stored in an appropriately named file in a stored data directory of the discovery tool 12. The format of the flat text file from the discovery engine is now processed for further utilization by the information security analysis system 10.

This text knowledge base flat file is processed by the data parsing tool 18 utilizing a keyword search of the knowledge base file to generate data in various categories. For example, data is organized in various categories as follows: unique user identification, host, LM-host, domain, LM-domain, SubNet, IP-address, WWW, MAC-address, NetWare host, NetWare network, NetWare station and various other available categories.

In addition to organizing the knowledge base 16 into various categories, the parsing tool may also create hashed output files.

Following parsing of the knowledge base 16 the analytical engine 20 responds to the data for preparation and converting into vector-based nodal diagrams. Typically the analytical engine 20 creates associations between a number of different charts to determine if such data charts correlate or differentiate. Relationships between an array of data sources is utilized to verify hypothesis, to correlate relationships among multiple data sets, and to identify target data within a large data set. Based on this analysis, the information security analysis system enables the development of resources for management of a network.

The analytical engine 20 analyzes network data to relate knowledge base data to session data, packet data, and alert data as these relationships are utilized to determine who has been talking to whom as well as the content of the traffic for specific protocols.

In the process of analyzing network data received by the discovery tool 12 (discovery engine) a determination must also be made as to what communication exist in more than one data set. Characterizing the data in this way utilizes taking a periodic snapshot of captured data over a time period. Averages are then made of what relationships exist to create a link chart representing traffic between data sets.

Figure 3:
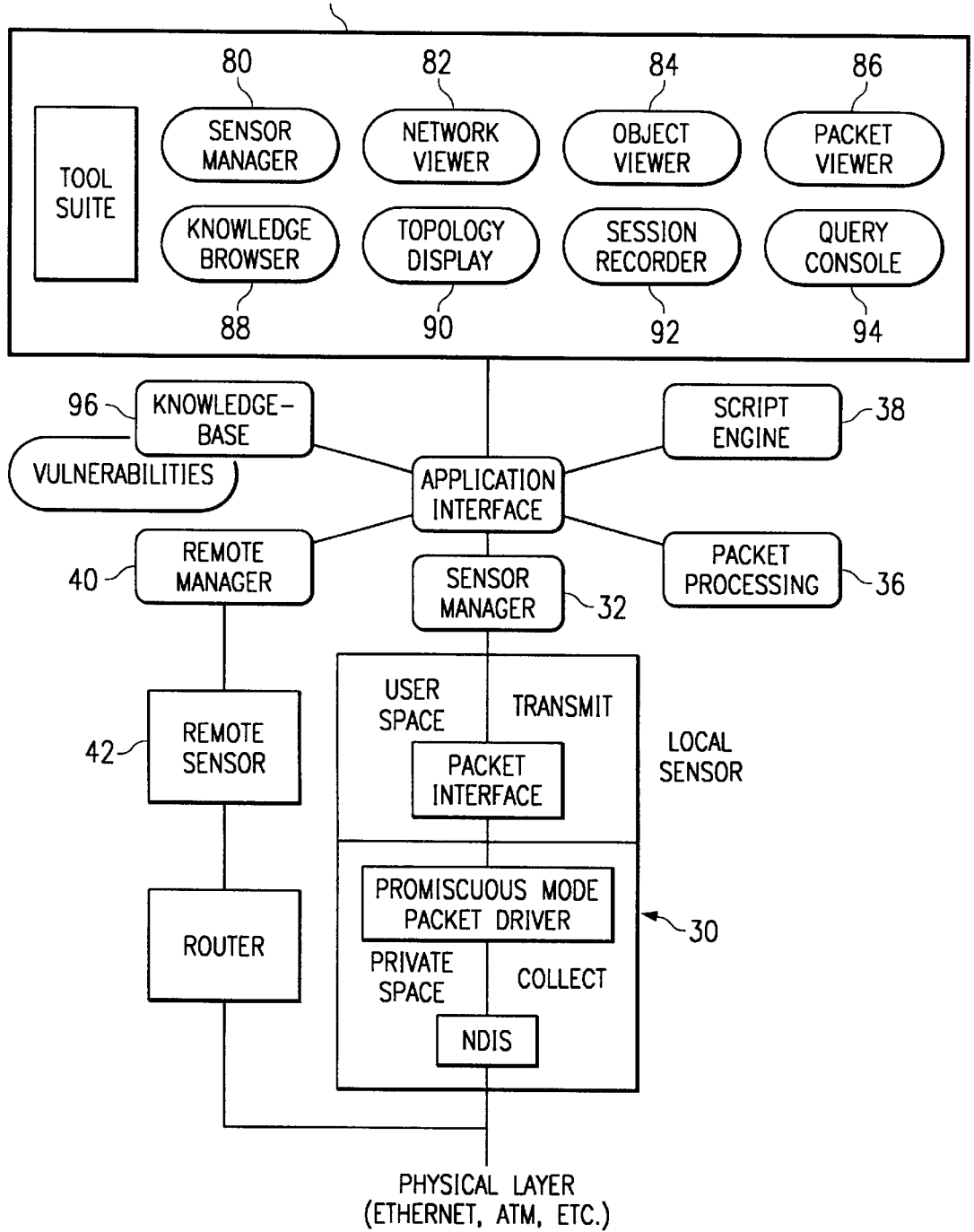
FIG. 3 is a block diagram illustrating the architecture for a discovery tool for use with the information security analysis system of FIG. 1.

Referring to FIG. 3 there is shown the architecture of a typical discovery tool 12 of FIG. 1 as illustrated in the application flow diagram of FIG. 2. One or more sensors are controlled by means of a specialized sensor to provide setup, collection, and transmit control. For the local Ethernet sensor an Ethernet driver sits above the NDIS layer to provide raw packets of network data. Packets of data are queued by a sensor manager 32 and then provided to all the tools in a tool suite 34. An internal packet-processing engine 36 decodes data packets and converts the raw data to information elements that are accessible to all the tools in a tool suite 34. In addition, a script engine 38 filters particularly interesting information and enters knowledge into the knowledge base 16. This database is also accessible by all the tools in the tool suite 34.

In addition to a specialized sensor, the discovery tool 12 also includes control of remote sensor 42. The remote manager 40 queries the remote sensor, for example, a web based monitor and query tool, to be provided to all the tools in the tool suite 34.

As illustrated in FIG. 3 the discovery tool 12 is organized as a tightly coupled sensor/processor that is based on a suite of inter operable tools. These tools provide visualization, mapping, and analysis of incoming data and processed knowledged. The sensor manager tool 80 provides configuration and control of the sensors within the discovery tool 12 that allows data to be collected (local or remote sensors) without being transmitted to the discovery tool. Various aspects of the sensor manager tool 80 include providing a view of sensors sorted at a top level according to the host, collection of all sensor data within a category, enables transmission of data from sensors to the discovery tool, again by selected category, enables communication from a remote sensor to the discovery tool, adds a new (remote) host and associated sensors to the sensor management tool control.

The network viewer tool 82 provides auto-discovery, auto-layout, and automatic visualization of network nodes and links. Nodes are sources of computer traffic, and include servers, hosts and clients. Links are representations of end to end traffic, and may transfer to higher level network elements (such as routers). The network viewer tool 82 reads packet information and provides a physical picture of one or more logical networks. The logical picture displays nodes and links information and provides a physical picture of one or more logical networks. The logical picture displays node and link information aggregated for multiple packets. Inasmuch as network traffic (nodes and links) exists at many instances of the OSI network model (data link, etc.), effective visualization occurs by examining the source network at many different layers. In one embodiment of the network viewer tool 82 circles on a graph window represents nodes and lines represent communication links. As the discovery tool 12 automatically discovers more nodes, the count for each network appears on the graph window along with a network label. As the node representation is tree-based, the count is an aggregate of all nodes below the reference node. Information that is relevant to a node from the knowledge base 16 will be displayed in the window of the object viewer tool 84.

The object viewer tool 84 is integrated with the network viewer tool 82, the topology display tool 90, and a query consult tool 94. The object viewer tool 84 actuates the display of information regarding all transitive relations (that are not address-based) that can be made regarding an object. For example, if an IP-address is associated with the user, and a user is associated with a host address, then these will all be a part of the object viewer tool display. However, if the host address is further associated with another IP-address, this transitive association is not displayed because of the confusion that may result in interpreting relations. With nodes being objects and links being relations, the object viewer tool 84 creates a list of objects displayed in a sort by class.

Analysis of data packets and data packet structure is provided by activation of the packet viewer tool 86. This provides the structure of or information within network packets and also helps to discern and understand new, unusual and/or proprietary protocols. When the packet viewer tool 86 is activated, a packet filter (not shown) is initially set to allow all updated packets to be captured. When a user is interested in certain packet types, then the packet viewer tool 86 allows the user to select certain subsets of packets via a packet filter setup dialog. Although the packet viewer tool 86 is useful for protocol debugging and development, the functionality of this tool also is useful to browse for new packet types.

Turning next to the knowledge browser tool 88, this tool is a visual interface for the knowledge base 16 and provides a tree-based approach to browsing objects in classes within the knowledge base, and in addition provides linkage information for tracing items and information passively discovered on the network by the discovery tool. The knowledge browser tool 88 enables acquisition, organization, and the categorization of network information, of tasks that require both automation for simplicity and customization for user accessibility.

Loosely, a class browsed by the knowledge browser tool 88 is an item in the knowledge base 16 containing categorized information, and can contain subclasses, objects, or both. Examples of classes are IP-ADDR, MAC-ADDR, and SMTP-sender An object, as considered in the context of the present invention, is a member of a class, and is an item in the knowledge base 16 having network-specific information.

The discovery tool 12 includes the script engine 38 (running as a separate thread) for processing information elements within received protocols to gather intelligence about objects within a network. Standard object types include users, hosts, domains, applications and addresses, however, and ontology specification allows new objects to be added. Using one way or two way bindings to relay information (for example, host and user), associations are made using information elements across multiple protocol/object types. Essentially, in accordance with the function of the present invention, a network becomes a linked graph contained in multi-dimensional space, where relationships are stored as links between vectors within this space.

Figure 8:
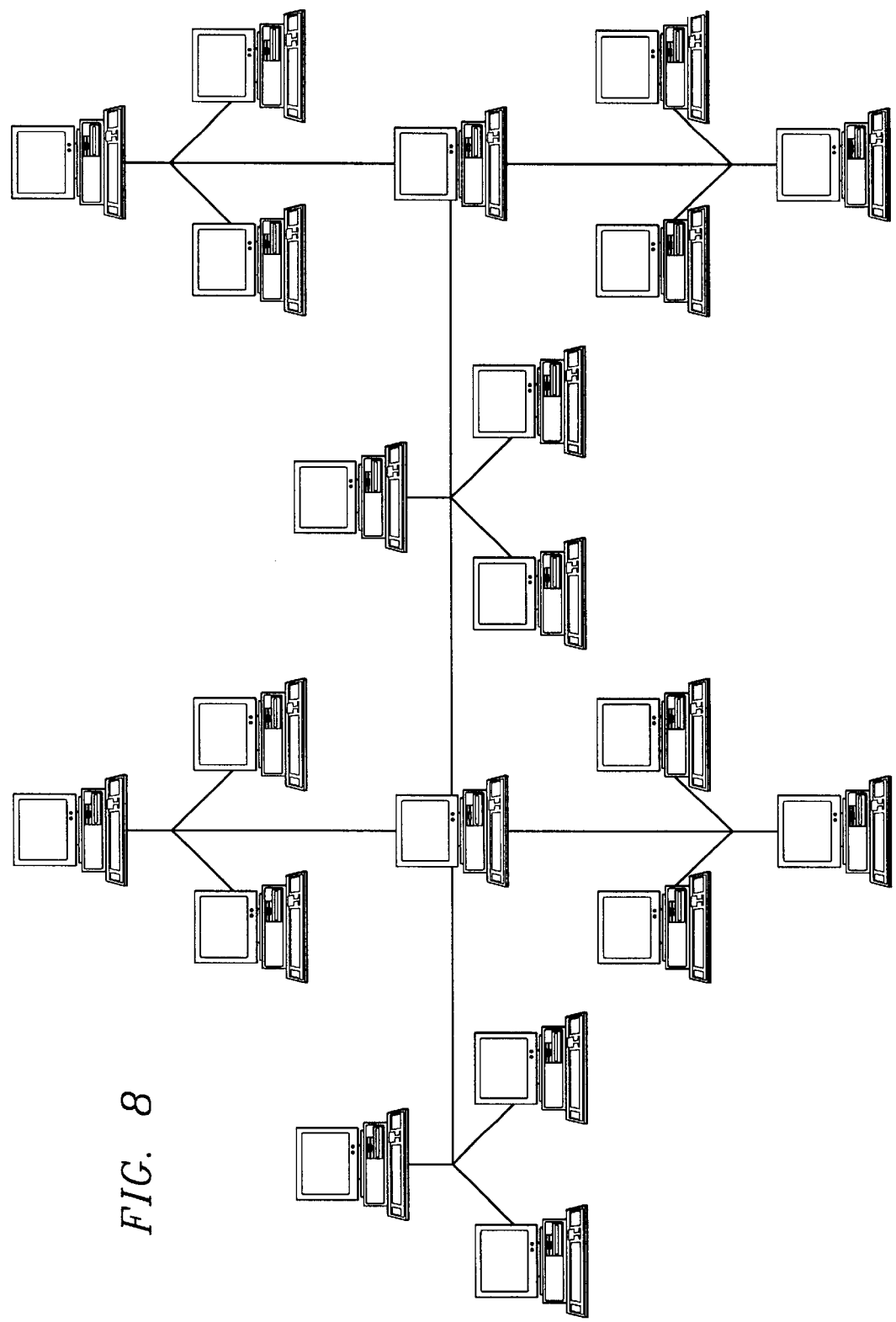
FIG. 8 is a typical display illustrating an object-oriented network visualization in accordance with the present invention.

Next, considering the topology display tool 90, this tool provides a compact, automatically generated view of the elements of a network identified by the discovery tool 12. FIG. 8 shows a typical window display upon activation of the topology display tool 90. Based on information contained within the knowledge base 16, the topology display tool 90 shows routers, SubNets, and user nodes. Furthermore, a subset of classes within the knowledge base 16 can be overlaid on top of this view. For example, host names and vulnerabilities can be shown.

The session recorder tool 92 enables packet reassembly, TCP/IP session management, and knowledge discovery. This tool is a mechanism for observing multiple session types which cannot easily be handled at the packet level, for example: HTTP, POP3, SMTP, SNMP, TELNET, NNTP, and IMAP. By reassembling packets and looking for key aspects of information across the reassembled packets, the session recorder tool 92 provides the capability for observing and learning about application level entities on the network.

In operation, the session recorder tool 92 reassembles connection-oriented flows, or sessions. These layer-4 (e.g., TCP) and above sessions consist of multiple packets, to be reassembled and parsed to expose application-level information. Packet and cell reconstruction techniques provide the user with state information (for example, call progress and session monitoring), as well as application layer information (for example, e-mail addresses). Utilizing session search techniques within the session recorder tool 92, combined with alert processing, capabilities (such as seeing when a certain user gets e-mail) can be flexibly constructed. In one implementation of a session recorder tool 92 there is provided viewing of the following sessions: HTTP, POP3, TELNET, FTP, SMTP, NNTP, and IMAP. During operation of the session recorder tool 92 data can be added to the knowledge base 16 as the tool detects, processes and scans sessions for various pieces of information.

The query consult tool 94 provides a text-based interface to the knowledge base 16. By utilization of the query consult tool 94, a user is able to determine if the knowledge base 16 contains an object (for example, individual IP address) or determine the set of objects belonging to a class of the knowledge base 16 (for example, IP-ADDR). In one implementation of the query consult tool 94, the knowledge base 16 was queried for top level class names, objects belonging to a given class and specific class objects.

In addition to the tool suite 34, the discovery tool 12 includes a knowledge base parsing tool set 96 as shown in FIG. 3. Following discovery of the data from the network under analysis, the data is then appropriately formatted for use by the analytical engine 20. The knowledge base parsing tool set 96 functions to take the collected data and put it into the appropriate format for use by the analytical engine 20. Individual tools in the knowledge base parsing tool set 96 are available to parse data from the knowledge base 16 and extract information from saved log files and reassembled session files. The knowledge base parsing tool set 96 comprises eight tools: KB parsing, E-mail extraction, session joining, web extraction, graphics extraction, KB summing, file manipulation, and column splitting.

The network discovery tool generates the knowledge base 16 of data assembled about a network. This data is stored in a flat text file and saved for reuse by the discovery tool 12 for display of a network. The format of the text, however, is not useful for follow on processing. The KB parsing tool, parses the data to be output for display in a columnar file, to be imported to a database, or to the analytical engines 20. In addition, the KB parsing tool is utilized as a key word search to generate data in various categories.

As explained, the session recorder tool 92 is a mechanism for observing multiple session types and generates files containing reassembled session data. The number of files created during a single data collection may, for example, exceed 10,000. The E-mail extraction tool of a knowledge base tool in the tool set 96 provides for organizing POP3 and SMTP files into summary descriptions. The summary descriptions are then imported to a database or to the analytical engine 20. The E-mail extraction tool contains a key word search mechanism as well as other types of data parsing.

As mentioned, the discovery tool 12 generates a knowledge base of flat file data collected about a network. The web extraction tool of a knowledge base tool set 96 facilitates the parsing and formatting of data from HTML flat files that are then imported to a database or to the analytical engines 20. The web extraction tool contains a tag (similar to a key word) search mechanism as well as other types of data processing algorithms.

The graphics extraction tool of the knowledge base tool set 96 provides for reassembling image files from a recorded format. The display of the session recorder tool 92 provides for the recording of HTTP sessions. These session files contain a header describing the session and the data associated with the session. When a JPG or GIF image is downloaded, the data is reassembled in the session. However, this data is not displayable in the recorded format. The graphic extraction tool converts the reassembled HTTP session file containing JPG and GIF data and creates a new log file containing the names and images.

Data stored in a flat text file by operation of the discovery tool 12 is utilized by the KB summation tool of the knowledge base tool set 96 to create a statistical matrix of the data contained in packet and session logs. For example, the instance of a protocol may be used as the Y access and the source IP address may be used as the X access. After selection of the packet or session log has been made, the KB summation tool screens the appropriate log file and displays available access criteria to create a graph. In the analysis of a typical network, a large number of files will be generated. The file manipulation tool of the knowledge base tool set 96 provides an interface to reduce the volume of generated files that must be sorted through. It enables files to be deleted or moved based on the file size, type, or contents for purposes of enhancing subsequent processing. Generated files are processed according to a chosen criteria for all files in a group.

Recorded sessions of the discovery tool 12 are occasionally truncated and restored as a new session. These truncated sessions are preferably reassembled before viewing. The session joining tool of the knowledge base tool set 96 connects all truncated sessions into completed transactions.

Also included in the knowledge base tool kit 96 is a split data column tool. This tool is used to remove unwanted columns of data from log files.

Figure 4:
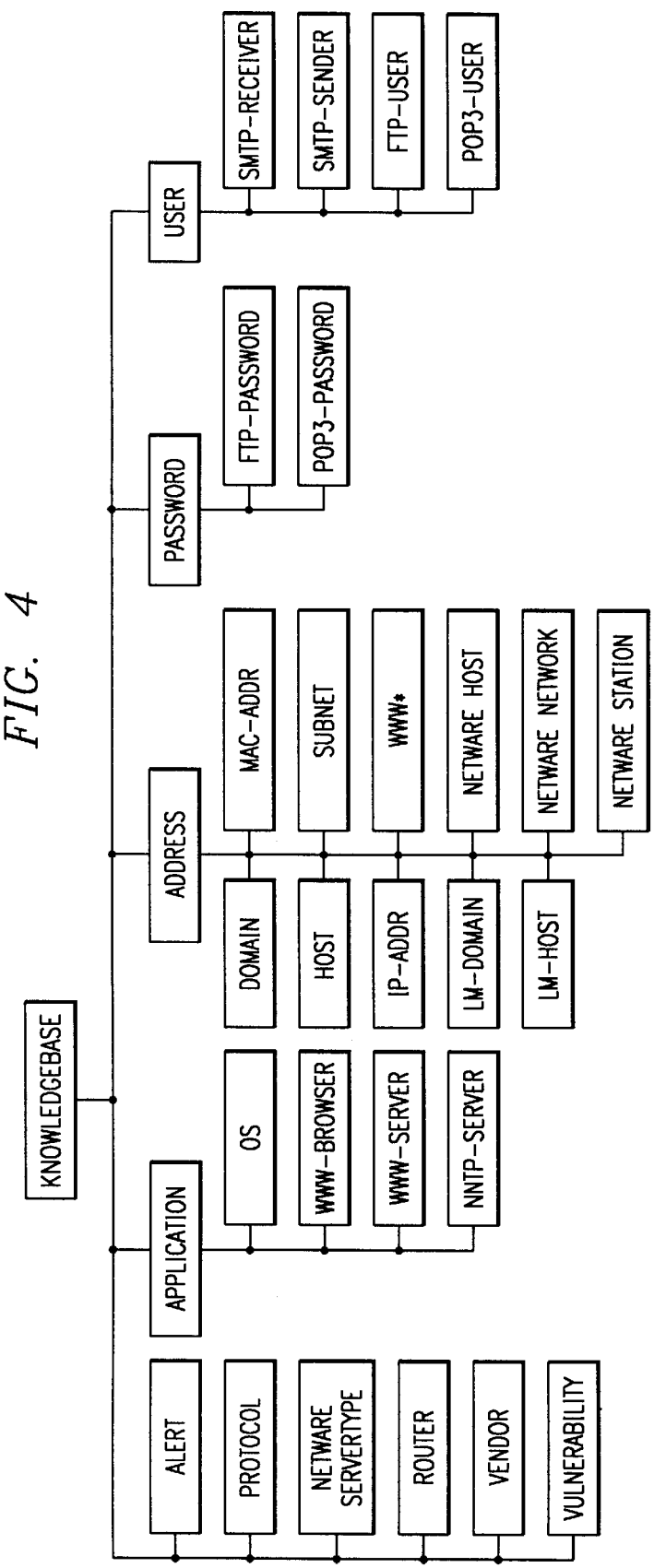
FIG. 4 schematically represents a typical information structure for the discovery tool illustrated in FIG. 3.

Referring to FIG. 4, there is shown a structuring of the information in the knowledge base 16. The definition and structure of the knowledge is taken into consideration to improve the ability to understand the knowledge prior to processing network information. FIG. 4 is an organizational chart of categories of information assembled in the knowledge base by the discovery tool 12. The knowledge base is an object-oriented relational entity that is stored as a flat text file and is information collected from packets on the data channel 14.

Figure 5:
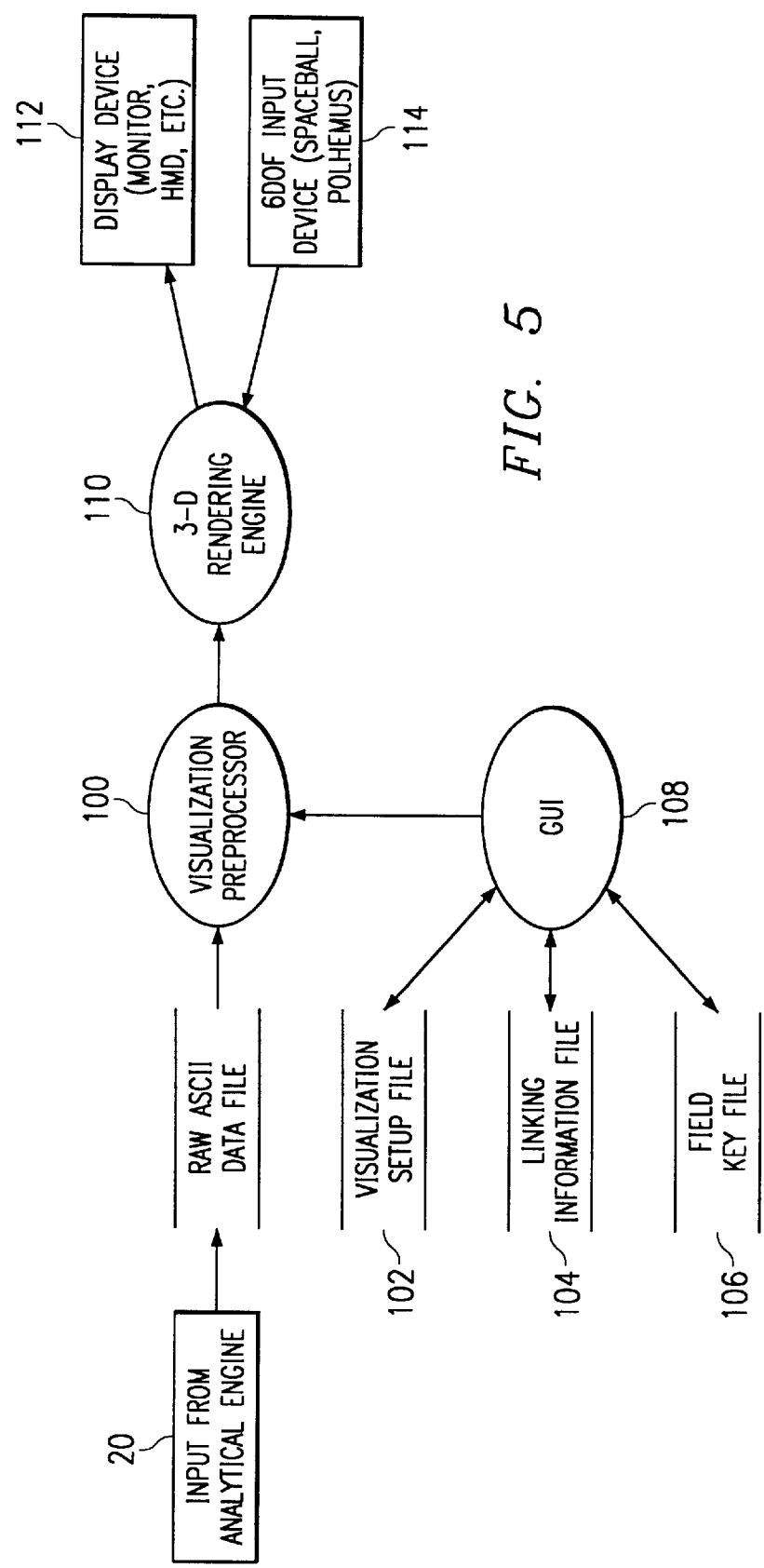
FIG. 5 is a block diagram of the 3-D visualization module of the information security analysis system of FIG. 1.

Referring to FIG. 5, there is illustrated a block diagram of the 3-D display 24 including a visualization pre-processor 100 receiving raw ASCII data from the analytical engine 20. Also input to the visualization pre-processor 100 through a software link 108 is a visualization setup file 102, a linking information file 104 and a field key file 106. Following processing of the data from the analytical engine 20, the visualization pre-processor 100 transfers the processed data to a 3-D rendering engine 110. The rendering engine 110, a commercial off the shelf software package, formats the information in accordance with user instructions from an input device 114 and arranges the information for input to a display 112.

Through the use of head mounted display technology and a six degree of freedom tracking system receiving data from the preprocessor 108, a user will experience full viewing immersion within the network identified with the data in the knowledge base 16. This technology provides the user with the further ability to interact and negotiate with the network data display, as opposed to a traditional flat display.

Referring again to FIG. 1, the 3-D display 24 adds a third dimension to any of the data collected by the discovery tool 12 to view, animate, and analyze complex nodal diagrams in 3-D space. This is required because the raw data file only contains two dimensions. If the data from the analytical engines outputted three or more dimensions, the 3-D display would not be required to add a third dimension. The addition of a third vector permits the simultaneous viewing of large complex diagrams on interconnected planes in accordance with user instructions from the input device 94. The display of FIG. 5 permits an analyst to rotate the diagram on any axis thereby viewing relationships that otherwise become obscure viewed on two-dimensional planes.

Figure 6:
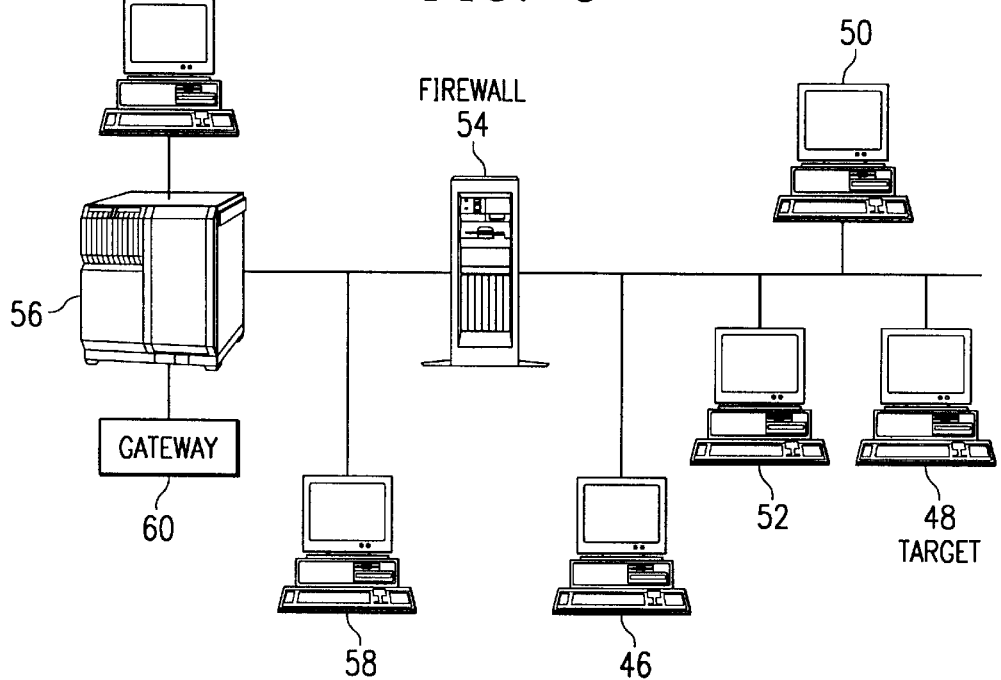
FIG. 6 is a block diagram of the information security analysis system of the present invention utilized as an intrusion detector.

Referring to FIG. 6 there is shown a representative utilization of the analysis system 10 of the present invention as illustrated in FIG. 1. The analysis system 10 is operated on a terminal 46 as part of a network including terminals 48, 50 and 52. The network including the terminals 46, 48, 50 and 52 is interconnected through a firewall 54. The firewall 54 interfaces with a network 56 that includes a network analyzer 58. The analyzer 58 analyzes inbound traffic to the terminals and also monitors for "meta data" associated with an intruder inbound to the network. Typically, the analyzer 58 establishes specific meta data associated with an inbound intrusion. As illustrated in FIG. 6, the network 56 is coupled to a gateway 60 and a terminal 62 representing a remote intruder to, for example, the terminal 48 as a target.

In the present example it will be assumed that the remote intruder on terminal 60 is attempting to send an E-Mail to the target terminal 48 behind the firewall 54. The analysis system 10 of the present invention running on the terminal 46, monitors through the discovery tool 12 the Ethernet level inbound e-Mail. The analysis system 10 records inbound e-mail traffic as part of the knowledge base 16 such as post office protocol version 3 (POP3)and the simple mail transfer protocol (SMTP). In addition, the analysis system 10 examines meta data associated with inbound E-Mail and further examines SMTP/POP3 packets inbound to the target terminal 48. Identified SMTP/POPS packets inbound for the target terminal 48 are passed to the analytical engine 20 for analysis. As previously explained, the analytical engine 20 imports the meta data passed by the discovery tool 12 for analysis and display.

Figure 7:
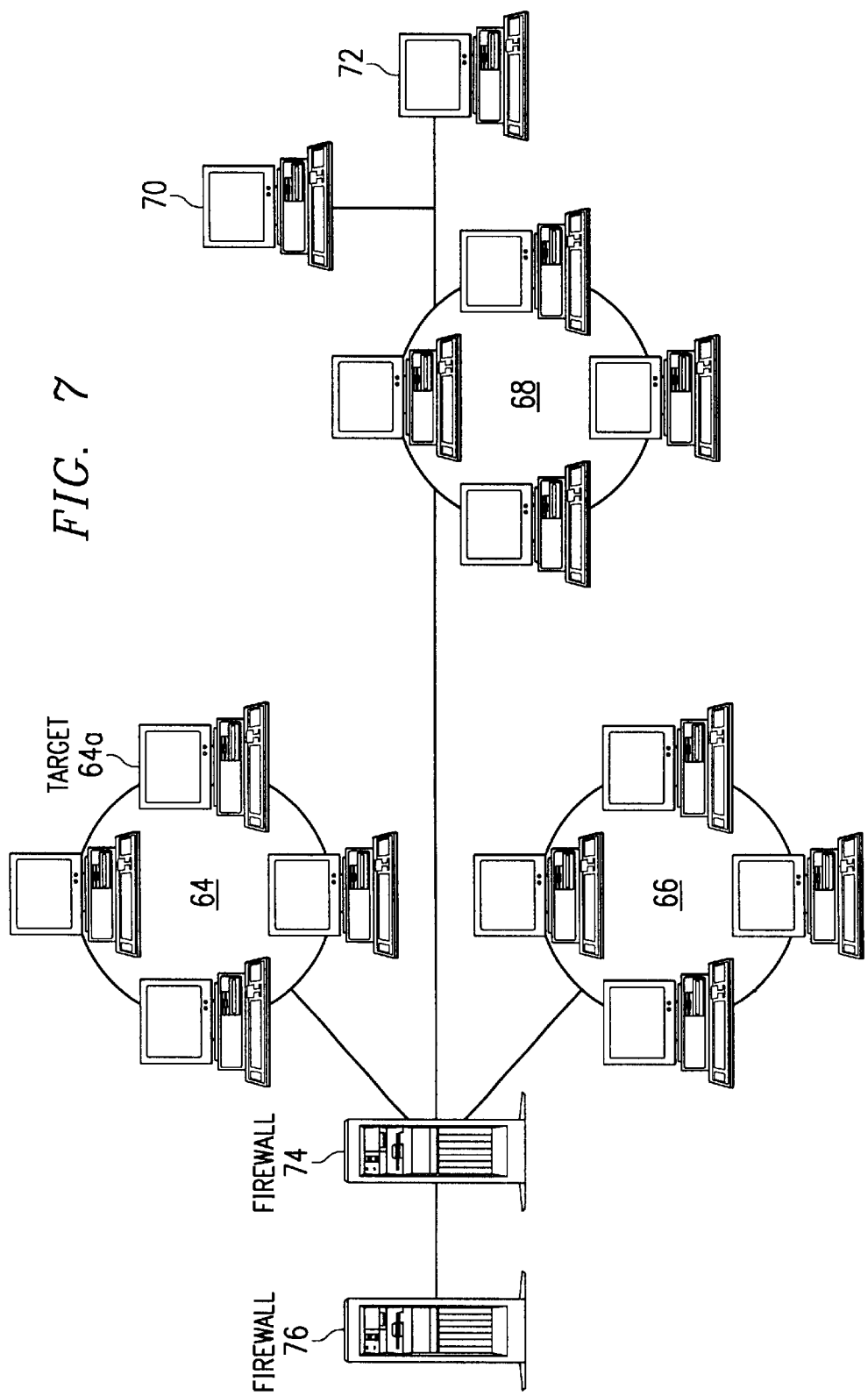
FIG. 7 is a block diagram of the information security analysis system of the present invention as an offensive tool for testing for a node attack or information hijacking.

Referring to FIG. 7 there is shown a utilization of the analysis system 10 of the present invention in an environment of a multi-node network. As illustrated, the network includes nodes 64, 66 and 68. Interconnected to the node 68 is a terminal 70 running the analysis system 10 as illustrated in FIG. 1. Also interconnected into the node 68 is a network analyzer 72. Each of the nodes 64, 66 and 68 interconnect to a firewall 74. The firewall 74 in turn is behind an additional firewall 76 that interconnects to a wide area network (not shown).

In this example the analysis system 10 as running on the terminal 70 monitors the level of intranet traffic and records packets of data from each of the terminals of the various nodes. For a terminal under attack, such as terminal 64a, the analysis system establishes a target source packet structure and by means of the analytical engine 20 of the present invention could be modified to shut down a target under attack.

It should be understood that FIGS. 6 and 7 are only two examples of utilization of the analysis system 10. Additional uses of the information security analysis system 10 include offensive and defensive information viewing, context nodal visualization of simultaneous E-mails, FTP and TELNET sessions, graphical playback of filtered nodal traffic, analyzing of computer source and executable code, passively and dynamically discovery of local area network or wide area network physical and virtual connectivity, detection intrusion both internal and external to a local area network or wide area network such as described with reference to FIG. 6, automatically alert and take corrective action when a network is under attack, FIG. 7, and detection of computer viruses.

While the invention has been described in connection with a preferred embodiment, it is not intended to limit the scope of the invention to the particular form set forth, but, on the contrary, it is intended to cover alternatives, modifications, equivalents as may be included within the spirit and scope of the invention as defined in the appended claims.

What is claimed is:

1. A method for analyzing and graphically displaying information from a data communications network, comprising:

gathering information on the types of code including the language of the code for a plurality of computer programs;

generating a knowledge base of information gathered on the types of computer code;

parsing the information in the generated knowledge base to generate data in selected categories in a readable format;

analyzing the data in selected categories for functional alteration between two or more codes for similar computer programs; and visualizing the analyzed data for graphical analysis and comparison of two or more computer programs to determine the degree of functional alteration.

2. A method for analyzing and graphically displaying as set forth in claim 1 wherein analyzing the data comprises sorting computer code by language; and visualizing the analyzed data comprises displaying the results of analyzing in a graphical functional format.

3. The method for analyzing and graphically displaying as set forth in claim 1 wherein visualizing the analyzed data comprises graphically displaying the comparison of two or more similar codes in multi-dimensional space to determine if the code has undergone single or multiple functional alterations.

4. The method for analyzing and graphically displaying as set forth in claim 1 wherein visualizing the analyzed data comprises code sequencing for comparison of two or more similar codes for computer programs.

5. The method for analyzing and graphically displaying as set forth in claim 1 further comprising appending to the generated information user definable symbols.

6. The method for analyzing and graphically displaying as set forth in claim 1 wherein analyzing the data includes identifying user computer identifiers and host computer identifiers.

7. The method for analyzing and graphically displaying as set forth in claim 1 wherein gathering information comprises passively collecting data and collecting data from external sensors.

8. A method for analyzing and visualizing a data communications network, comprising:
gathering information on types of computer code;
generating a knowledge base of the information gathered on the types of computer code;
parsing the information in the generated knowledge base to generate data in selected categories in readable format;
analyzing the data in the selected categories for functional alteration between two or more similar codes for computer programs; and
visualizing the analyzed data for comparison of two or more similar codes for computer programs to determine the degree of functional alteration.

9. The method for analyzing and visualizing as set forth in claim 8 wherein generating a knowledge base includes documenting and organizing the code in a functional relationship.

10. The method for analyzing and visualizing as set forth in claim 8 wherein analyzing the data comprises sorting code by language; and visualizing the analyzed data comprises displaying the results of analyzing in a graphical functional format.

11. The method for analyzing and visualizing as set forth in claim 8 wherein visualizing the analyzed data comprises graphically displaying the comparison of two or more similar codes in multi-dimensional space to determine if the code has undergone single or multiple functional alterations.

12. The method for analyzing and visualizing as set forth in claim 8 wherein visualizing the analyzed data comprises code sequencing for comparison of two or more similar codes for computer programs.

13. The method for analyzing and visualizing as set forth in claim 8 further comprising appending to the generated information user definable symbols.

14. The method for analyzing and visualizing as set forth in claim 8 wherein analyzing the data includes identifying user computer identifiers and host computer identifiers.

15. The method for analyzing and visualizing as set forth in claim 8 wherein gathering information comprises passively collecting data and collecting data from external sensors.

16. A method for analyzing and graphically displaying information from a data communications network, comprising:
gathering information including structure of the network, operation of the network and network users;
generating a knowledge base of the information gathered and related to the network;
parsing the information in the generated knowledge base to generate data in selected categories in readable format;
analyzing the data in selected categories for preparation of visualizing diagrams; and
displaying the analyzed data for graphical analysis of the gathered information for animation of network traffic and structure.

17. The method for analyzing and graphically displaying as set forth in claim 16 wherein analyzing the data comprises sorting the codes by language; and displaying the analyzed data comprises displaying the sorted code by language in a graphical, functional format.

18. A method for analyzing and graphically displaying information from a data communications network, comprising:
gathering information including traffic on the network to monitor network code;
analyzing the gathered information on network traffic to determine differences occurring within the various codes on the network; and
displaying the analyzed information graphically as a three-dimensional virtual view of the network.

19. The method for analyzing and graphically displaying as set forth in claim 18, wherein analyzing the gathered information comprises preparation and converting codes on the network into vector-based nodal diagrams.

20. The method for analyzing and graphically displaying as set forth in claim 18, wherein gathering traffic on a network comprises gathering structure information of the network, operation of the network, and network users.

21. The method for analyzing and graphically displaying as set forth in claim 18, wherein analyzing the gathered information on the network comprises analyzing the gathered information to relate session data, packet data and alert data to content of traffic on the network.

* * * * *

UNITED STATES PATENT AND TRADEMARK OFFICE
CERTIFICATE OF CORRECTION

PATENT NO. : 6,269,447 B1  
DATED : July 31, 2001  
INVENTOR(S) : Michael P. Maloney et al.

Page 1 of 1

It is certified that error appears in the above-identified patent and that said Letters Patent is hereby corrected as shown below:

<u>Title page,</u>  
Item [56], U.S. PATENT DOCUMENTS, after "Sato", insert -- et al. --; and after "6,043,825", delete "2/2000", and insert -- 3/2000 --; and delete "6,067,106", and insert -- 6,076,106. --.

<u>Column 4,</u>  
Line 42, after "from", delete "i2" and insert -- i2. --.

<u>Column 6,</u>  
Line 3, after "space", insert -- . --; and after "data." delete "enable", and insert -- enables --.  
Line 4, after "diagrams", insert -- , --.

<u>Column 8,</u>  
Line 55, after "SMTP-sender", insert -- . --.  
Line 62, after "addresses", delete ",", and insert -- ; --.  
Line 63, after "however", delete "and", and insert -- an --.

<u>Column 11,</u>  
Line 65, after "Identified", delete "SMTP/POPS", and insert -- SMTP/POP3 --.

Signed and Sealed this

Twenty-eighth Day of May, 2002

*Attest:*

JAMES E. ROGAN  
*Attesting Officer*     *Director of the United States Patent and Trademark Office*

UNITED STATES PATENT AND TRADEMARK OFFICE
Certificate

Patent No: 6,269,447 B1                                                               Patented: July 31, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michael P. Maloney, Severna Park, MD; John M. Suit, Pasadena, MD; John M. Suite, Pasadena, MD; Christopher J. Scott, Mt. Airy, MD; Richard R. Rubel, Glen Burnie, MD; and Francis M. Woodus, Owings Mills, MD.

Signed and Sealed this Fifteenth Day of November 2005.

ROBERT W. BEAUSOLIEL, JR.
*Supervisory Patent Examiner*
Art Unit 2184